United States Patent Office 3,255,216
Patented June 7, 1966

3,255,216
1-PHENYLAMINO-ANTHRAQUINONE
COMPOUNDS
Peter Hindermann, Batterie, Basel, and Hans Peter Kölliker, Munchenstein, Basel-Land, Switzerland, assignors to J. R. Geigy A.-G., Basel, Switzerland
No Drawing. Filed Jan. 4, 1962, Ser. No. 164,414
Claims priority, application Switzerland, Jan. 5, 1961, 93/61, 94/61
7 Claims. (Cl. 260—380)

The present invention concerns vicinally substituted 1-phenylamino-anthraquinone compounds, processes for the production thereof, their use for the dyeing of polyester fibres as well as, as industrial product, the polyester material dyed by the use of these anthraquinone compounds.

The invention involves 1-phenoxyphenylamino-4-hydroxyanthraquinone and 1-phenylthiophenylamino-4-hydroxyanthraquinone compounds of the Formula I

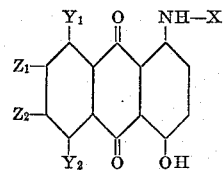

(I)

In this formula:

X is the organic radical of an aminodiphenyl ether or thioether vicinally substituted with regard to the amino group which contains no salt-forming substituents which dissociate acid in water, $Y_1$ and $Y_2$ each independently is the hydroxyl group if $Z_1$ and $Z_2$ are hydrogen, or hydrogen, $Z_1$ and $Z_2$ each independently is halogen if $Y_1$ and $Y_2$ are hydrogen, or they are hydrogen.

These compoonds are obtained if a 1,4-dihydroxyanthraquinone compound which can be substituted in each of the 5- and 8-positions by the hydroxyl group or in each of the 6- and 7-positions by halogen, or a mixture thereof with its leuco compound is reacted, at a raised temperature in the presence of esters of boric acid, with 1,3-diols, or if such a compound or mixture is reacted in the presence of components forming this ester, with an aminodiphenyl ether or thioether vicinally substituted with regard to the amino group which contains no salt-forming substituents which dissociate acid in water.

Particularly valuable dyestuffs correspond to the Formula II

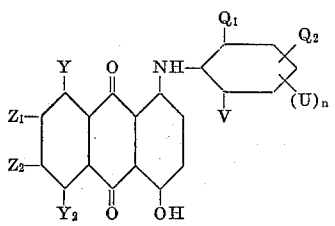

(II)

wherein $Y_1$ and $Y_2$ each independently is H or OH and
Each of $Z_1$ and $Z_2$ independently is H or halogen, especially chlorine,
One of $Q_1$ and $Q_2$ is unsubstituted phenyloxy or phenyloxy substituted by halogen, lower alkyl and lower alkoxy or unsubstituted phenylthio or phenylthio substituted by halogen, lower alkyl and lower alkoxy (chloro, methyl, ethyl, methoxy or ethoxy being particularly advantageous substituents), And the other of $Q_1$ and $Q_2$ is hydrogen, lower alkyl, especially alkyl having 1 to 3 carbon atoms or lower alkoxy especially methoxy,
V is lower alkyl especially alkyl having 1 to 3 carbon atoms or lower alkoxy especially methoxy,
U is lower alkyl especially alkyl having 1 to 2 carbon atoms,
n is one of the numerals 0 to 2 inclusive with the limitations in the above structural formula that (1) $Q_1$ is always different from hydrogen and (2) at least both $Y_1$ and $Y_2$ or both $Z_1$ and $Z_2$ must be hydrogens.

In addition, dyestuffs of the formula

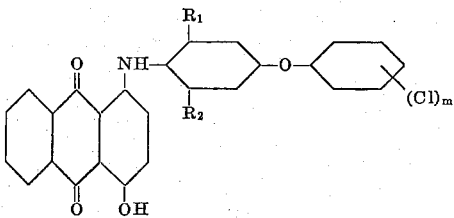

wherein $R_1$ and $R_2$ each is independently a lower alkyl radical having 1 to 2 carbon atoms and
m is one of the numerals 0 to 2 inclusive are preferred.

In addition it is advantageous if, in Formula II, V is alkyl if $Q_1$ is phenyloxy or phenylthio.

In the process according to the invention, the following anthraquinone compounds can be employed, for example, as starting materials: 1,4-dihydroxyanthraquinone, 1,4,5 - trihydroxyanthraquinone, 1,4,5,8-tetrahydroxyanthraquinone, 1,4-dihydroxy-6-fluoro- or -6-chloro- or -6-bromo-anthraquinone, 1,4-dihydroxy-6,7-dichloro- or -6,7-dibromo-anthraquinone.

As starting materials, aminodiphenyl ethers or thioethers vicinally substituted with regard to the amino group are employed which contain no salt-forming substituents which dissociate acid in water such as sulphonic acid or carboxylic acid groups or salts thereof but in which the benzene rings can contain other substituents as desired which are inert under the reaction conditions, for example: lower alkyl groups such as methyl, ethyl, propyl, butyl, pentyl groups; halogens such as fluorine, chlorine, bromine; lower alkoxy groups such as methoxy, ethoxy, butoxy groups; or lower alkylsulphonyl groups such as methylsulphonyl, ethylsulphonyl, butylsulphonyl groups. The phenylamines used according to the invention contain, as substituents in a position vicinal to the amino group, principally lower alkyl groups, in particular methyl groups, in addition the possibly further substituted phenoxy or phenyl thio group, also halogen, particularly chlorine, or lower alkoxy groups, particularly methoxy or ethoxy groups. In the process according to the invention, the following are utilised as vicinally substituted aminodiphenyl ethers and thioethers:

4-amino-3,5-dimethyl-diphenyl ether and -diphenylthioether,
4-amino-3,5,2'-trimethyl-diphenylether and -diphenylthioether,
4-amino-3,5,3'-trimethyl-diphenylether and -diphenylthioether,
4-amino-3,5,4'-trimethyl-diphenylether and -diphenylthioether,
4-amino-3,5,3',5'-tetramethyl-diphenylether and -diphenylthioether,
4-amino-3,5,3',4'-tetramethyl-diphenylether and -diphenylthioether, 4-amino-3,5-dimethyl-4'-methoxy- or 4'-ethoxy- diphenylether and -diphenylthioether,
3-amino-2,4-dimethyl-diphenylether and -diphenylthioether,
3-amino-2,4,6-trimethyl-diphenylether and -diphenylthioether,
2-amino-3-methyl-diphenylether and -diphenylthioether,
2-amino-3,4'-dimethyl-diphenylether and -diphenylthioether,
2-amino-3,5-dimethyl-diphenylether and -diphenylthioether,
2-amino-3,5,4'-trimethyl-diphenylether and -diphenylthioether,
4-amino - 3,5 - dimethyl-4'-chloro-diphenylether and -diphenylthioether,
4-amino-2,3,5,6-tetramethyl-diphenylether and -diphenylthioether,
4-amino-2,3,5,6,4'-pentamethyl-diphenylether and -diphenylthioether,
4-amino-3,5-diethyl-diphenylether and -diphenylthioether,
4-amino-3,5-diethyl-4'-methyl-diphenylether and -diphenylthioether,
4-amino-3,5-diethyl-4'-methoxy- or -4'-ethoxy- diphenylether and -diphenylthioether,
4-amino-3,5-diethyl-4'-chloro-diphenylether and -diphenylthioether,
4 - amino-3,5-dimethyl-4'-methylsulphonyl-diphenylether or thioether,
4-amino-3-methyl-5-ethyl-diphenylether.

Because of their greater stability under the reaction conditions, the diphenyl oxygen ethers are preferred.

These amino-diphenylethers and -thioethers are obtained by processes known per se, for example by reaction of phenols or thiophenols or their alkali metal salts with the corresponding amino- or nitro-halogenbenzenes, the reaction being performed at raised temperatures in the presence of copper catalysts, and possibly followed by reduction of the nitro group to the amino group.

The condensation of 1,4-dihydroxyanthraquinone compounds with the vicinally substituted aminodiphenyl ethers or thioethers is performed at raised temperatures, e.g. at 100–200° C., advantageously in excess aminodiphenyl ether or thioether in the melt, or also in inert organic solvents, e.g. in higher boiling alkanols such as butanol. However, for a good control of the reaction of 1,4-dihydroxyanthraquinone compound to form 1 - phenoxyphenylamino - 4 - hydroxyanthraquinone or 1 - phenylthiophenylamino - 4 - hydroxyanthraquinone compound, the presence is important of an ester of boric acid with a 1,3-diol or of components which, under the reaction conditions, form such an ester, e.g. in the presence of boric acid and of 1,3-diols in which the alcoholic hydroxyl groups are bound either in the end position and/or in the middle or normal or branched hydrocarbon chains, excess alkane diol being used as solvent. Either the completely formed boric acid esters of such diols or boric acid in the presence of such diols are used, advantageously in amounts which are about equivalent to the 1,4-dihydroxyanthraquinone used and the components are heated at the suitably higher temperature until no more 1,4-dihydroxyanthraquinone can be traced in the reaction mixture, which generally is only after several hours. However, the esters of boric acid with 1,3-diols or components thereof can also be used in amounts which vary considerably from the equivalent based on 1,4-dihydroxyanthraquinone, for example 0.5 to 2 equivalents.

The 1 - phenylaminoanthraquinone compounds containing phenoxy or phenylthio groups according to the invention are obtained from the reaction mixture advantageously by dilution of the mixture with an organic solvent for the aminodiphenyl ether or thioether used, e.g. by using alkanols such as e.g. methanol or ethanol. They can also be isolated by pouring the reaction mixture into warm, dilute mineral acid whereupon the excess aminodiphenyl ether or thioether dissolves and the dyestuff precipitates. The anthraquinone compounds according to the invention can be further purified by recrystallisation.

In the pure state, they are shimmering, crystalline, deeply coloured bodies. In hot organic solvents they dissolve with a pure violet or blue shade. Finely distributed in aqueous dispersion in the presence of carriers such as for example phenylphenol, they dye polyester fibers such as cellulose triacetate or terephthalic acid polyester, at the boiling point of the water or at temperatures of over 100° C. under pressure, in very pure violet or blue shades which are fast to light, sublimation and industrial fumes. They can be used, for example, for the dyeing of the following marketed polyester fibres: "Terylene" (ICI, Manchester, Great Britain), "Dacron" (Du Pont de Nemours, Wilmington, Del., U.S.A.), "Terital" (Rhodiatoce, Milan, Piazza Erculea 15, Italy), "Terlenka" (Aku, Arnhem, Netherlands), "Tergal" (Rhodiaceta, Lyons, France), "Trevira" (Farbwerke, Hoechst, Germany) or "Kodel" (Eastman Kodak Chemicals Inc., Kingsport, Tenn., U.S.A.).

The dyestuffs according to the invention, however, can also serve to dye lacquers and spinning masses, as well as intermediate products in the synthesis of other dyestuffs.

The following examples further illustrate the invention. The temperatures are given therein in degrees centigrade. Where not otherwise expressly stated, the parts are given as parts by weight. The relationship of parts by weight to parts by volume is as that of grammes to cubic centimetres.

Example 1

A homogeneous mixture of 12 parts of 1,4-dihydroxyanthraquinone and 12.1 parts of 1,4-dihydroxy-leuco anthraquinone is added at about 80° to the melt of 127.8 parts of 4-amino-3,5-dimethyl-diphenyl ether. 4.65 parts of ortho-boric acid and 9.2 parts of 2-methyl-2,4-pentane diol are then added. The reaction mixture is then heated within half an hour to 130° in an atmosphere of nitrogen and the water which is formed is simultaneously distilled off through a sloping condenser. The temperature is kept for another 24 hours at 130–135°, then cooled to 75° and 200 parts of methanol are added to the reaction mixture, whereupon the dyestuff of the formula

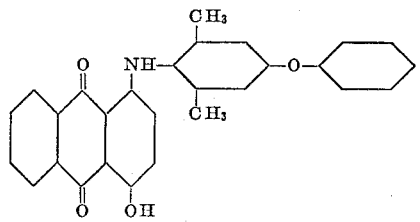

preciptates as a dark powder. It is obtained in the form of dark, analytically pure crystals which melt at 163–164° by recrystallisation from n-butyl alcohol. Dissolved in concentrated sulphuric acid, it dissolves with a blue colour and in organic solvents with a violet colour.

After milling with the sodium salt of dodecylbenzene sulphonic acid, it dyes polyester fibres from an aqueous dispersion, possibly in the presence of carriers such as o-phenylphenol, in clear, violet shades which have excellent fastness to light, sublimation and industrial fumes.

If, instead of the 4-amino-3,5-dimethyl-diphenylether, 136.2 parts of 4-amino-3,4',5-trimethyl-diphenylether or 4-amino-3,3',5-trimethyl-diphenylether or 4-amino-2'3,5-trimethyl-diphenylether or 144.6 parts of 4-amino-3,3',5,5'-tetramethyl-diphenylether or 144.6 parts of 4-amino-2',3,5-trimethyl-4'-ethyldiphenyl ether or 154.2 parts of 4-amino-2',3,5-trimethyl-4'-ethoxy-diphenylether or 147 parts of 4-amino-3,5-dimethoxy-diphenylether are used, then dyestuffs which dye polyester fibres in very similar violet shades with the same good fastness properties are obtained.

Example 2

117.15 parts of 4-amino-3,5-dimethyl-diphenylether are placed in a reaction flask and a mixture of 15.5 parts of 1,4-dihydroxy-6,7-dichloroanthraquinone, 15.6 parts of 1,4-dihydroxy-6,7-dichloro-leuco-anthraquinone and 4.65 parts of ortho-boric acid are added while stirring. Finally 5.9 parts of 1,3-propane diol are added dropwise and the whole is distilled at 110–115° in a weak stream of nitrogen, the condensation water being distilled off through a sloping condenser. After two hours, the temperature of the mixture is raised to 125° and then kept at 125–130° for 30 hours, the progress of the reaction being noted by the intensive violet colouration of the reaction melt. The mixture is then poured into 200 parts of 40° warm water and hydrochloric acid is added until Congo red paper is clearly coloured blue, excess aminodiphenyl ether being dissolved. The precipitated dyestuff of the formula

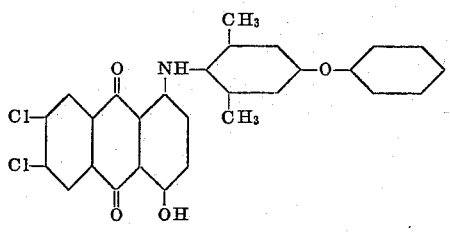

is filtered off, washed first with very diluted hydrochloric acid and finally with water until the filtrate runs neutral. On recrystallising the dyestuff from n-butyl alcohol, the dyestuff is obtained as a dark coarsely crystalline powder which dissolves in concentrated sulphuric acid with a blue and in organic solvents with a blue-violet colour.

Finely distributed in aqueous dispersion, it dyes polyester fibers under the usual dyeing conditions in violet shades which have good fastness to light and washing.

If in this example, the 4-amino-3,5-dimethyl-diphenyl ether are replaced by 133.65 parts of 4-amino-3,5-dimethyl-4'-methoxy-diphenyl ether, or if instead of the 15.5 parts of 1,4-dihydroxy-6,7-dichloroanthraquinone and 15.6 parts of 1,4-dihydroxy-6,7-dichloro-leuco-anthraquinone, a mixture of 13.73 parts of 1,4-dihydroxy-6-chloroanthraquinone and 13.83 parts of 1,4-dihydroxy-6-chloro-leuco-anthraquinone are used, then dyestuffs which dye polyester fibers in similar violet shades are obtained.

Example 3

9.2 parts of 2-methyl-2,4-pentane diol are added to a homogeneous mixture of 9.6 parts of 1,4-dihydroxyanthraquinone, 14.52 parts of 1,4-dihydroxy-leuco-anthraquinone, 4.65 parts of ortho-boric acid and 136.2 parts of 3-amino-2,4,6-trimethyldiphenyl ether and the mixture is heated at 105–110° in and atmosphere of nitrogen while stirring slowly until no more condensation water is distilled off through a sloping condenser. To complete the reaction, the mixture is heated for another 20 hours at 130–135° and, after cooling to 85°, 300 parts of ethanol are added. The dyestuff of the formula

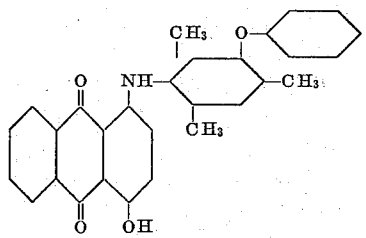

separates out on cooling to room temperature in the form of a black powder. It is purified by crystallisation from isobutyl alcohol. It dissolves in concentrated sulphuric acid with a blue and in organic solvents with a red-violet colour.

Polyester fabric is dyed a very fast red-violet shade from an aqueous dispersion of the finely distributed dyestuff under the usual conditions in the presence of phenylphenol.

If in this example, the 3-amino-2,4,6 - trimethyl - diphenyl ether is replaced by 127.8 parts of 3-amino-2,4-dimethyldiphenyl ether or 144.6 parts of 3-amino-2,4-dimethyl-6-ethyldiphenyl ether or 161.4 parts of 3-amino-2,4,6-triethyl-diphenyl ether or 169.8 parts of 3-amino-2,4-diisopropyl-6-methyl - diphenyl ether or 169.8 parts of 3-amino-2-methyl - 4,6 - diisopropyl - diphenyl ether, then very similar dyestuffs are obtained, the dyeings of which on polyester fabrics have the same good fastness properties.

Example 4

4.65 parts of ortho-boric acid and 9.5 parts of 2-methyl-2,4-pentane diol are added in an atmosphere of nitrogen to 12 parts of 1,4-dihydroxyanthraquinone, 12.1 parts of 1,4-dihydroxy-leuco-anthraquinone and 117.41 parts of 2-amino-3-methyl-diphenylether. The mixture is slowly heated to 130° and kept for 24 hours at this temperature.

After cooling to 100°, the mixture is added dropwise within 1 hour while stirring well at 60° to 500 parts of 3.6% hydrochloric acid. The precipitated blue-black condensation product of the formula

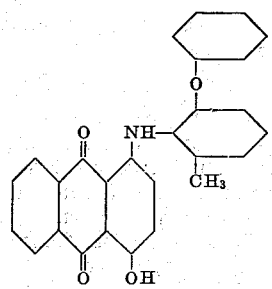

is filtered off, the filter cake is washed first with dilute hydrochloric acid and then with 50° warm water until the washing water is neutral and then dried at 100°.

The dyestuff is further purified by recrystallisation from n-butyl alcohol when it then melts at 177–178.5°. It dissolves in concentrated sulphuric acid with a blue and in organic solvents such as hot butanol with a violet colour.

Terephthalic acid polyglycol ester is dyed at 95–98° from an aqueous dispersion of the finely distributed dyestuff in violet shades which have good fastness to light, sublimation and washing.

If in the above example, instead of the 2-amino-3-methyl-diphenyl ether, 125.67 parts of 2-amino-3,4'-dimethyl-diphenyl ether or 133.93 parts of 2-amino-3,4',5-trimethyl-diphenyl ether or 125.67 parts of 2-amino-3,5-dimethyl-diphenyl ether are used, then dyestuffs are obtained which dye polyester fibres in similar violet shades. The polyester dyeings attained therewith also have good fastness to light, sublimation and washing.

Example 5

The mixture of 10.8 parts of 1,4-dihydroxyanthraquinone and 13.31 parts of 1,4-dihydroxy-leuco-anthraquinone is added at 80° while stirring to the melt of 137.4 parts of 4-amino-3,5-dimethyl - diphenylthioether. After addition of 4.65 parts of ortho-boric acid and 9.2 parts of 2-methyl-2,4-pentane diol, the mixture is heated at 130–135° in a weak atmosphere of nitrogen with simultaneous distillation off of the water formed until no more 1,4-dihydroxyanthraquinone or 1,4 - dihydroxy - leuco - anthraquinone can be detected in a sample thereof.

The melt is then slowly stirred into 400 parts of methanol with external cooling, whereupon the dyestuff of the formula

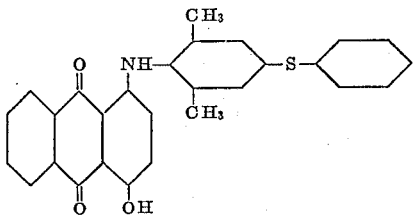

precipitates as a fine, dark powder. It is filtered off, washed with boiling methyl alcohol and then dried. It is further purified by recrystallisation from tert. amyl alcohol. In sulphuric acid it dissolves with a dull blue colour and in organic solvents such as cyclohexanol it dissolves with a violet colour.

The finely distributed dyestuff dyes polyester fibres under the conditions usual for disperse dyestuffs in violet shades which have good fastness to light, washing, sublimation and industrial fumes.

Very similar dyestuffs with equally good fastness properties are obtained if in the above example, 145.8 parts of 4-amino-3,4′,5-trimethyl-diphenylthioether, or 158.1 parts of 4-amino-3,5-dimethyl-4′-chlorodiphenylthioether, or 178.8 parts of of 4-amino-3,5-dimethyl-2′,4′-dichlorodiphenylthioether, or 154.2 parts of 4-amino-3,5-dimethyl-4′-ethyldiphenylthioether, or 163.8 parts of 4-amino-3,5-dimethyl-4′-ethoxydiphenylthioether are used in the method described instead of the 4-amino-3,5-dimethyldiphenylthioether.

Example 6

12 parts of 1,4-dihydroxyanthraquinone, 12.1 parts of 1,4-dihydroxy-leuco-anthraquinone and 144.6 parts of 4-amino-2,3,5,6-tetramethyl-diphenyl ether are melted together while stirring and, after the addition of 4.65 parts of ortho-boric acid and 10.6 parts of tetrahydroxymethylmethane ("pentaerythrite") the whole is heated for 24 hours at 125–135°. The water which forms mainly at the beginning of the reaction is distilled off in a weak stream of nitrogen.

The dyestuff formed of the formula

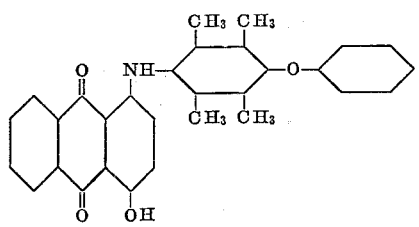

can be recognised by the violet colouration of the melt. It is precipitated in a finely pulverulent form by diluting the reaction mixture with 350 parts of methyl alcohol whereupon it is filtered off. It is obtained in a pure form by recrystallisation from n-butyl alcohol. It dissolves in concentrated sulphuric acid with a blue and in organic solvents with a violet colour.

Polymeric ethylene glycol terephthalate is dyed from an aqueous dispersion of the finely distributed dyestuff under the conditions usual for disperse dyestuffs in shades which have good fastness to light and washing.

If in the above example, the 4-amino-2,3,5,6-tetramethyl-diphenylether are replaced by 153 parts of 4-amino-2,3,4′,5,6-pentamethyl-diphenylether, then a dyestuff which is very similar in every way is obtained.

Example 7

The mixture of 13.6 parts of 1,4,5,8-tetrahydroxyanthraquinone and 13.7 parts of 1,4,5,8-tetrahydroxyleuco-anthraquinone is added at 80° to the melt of 136.2 parts of 4-amino-2′,3,5-trimethyl-diphenylether. After the addition of 14.4 parts of the ester from 1 mol of ortho-boric acid and 1 mol of 2-methyl-2,4-pentane diol, the whole is heated for 2 hours at 110° and then for 25 hours at 130–135°.

The condensation of the formula

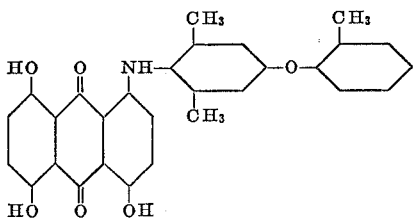

is worked up and isolated by adding 250 parts of methyl alcohol to the reaction mixture at 75°. The dyestuff is very difficultly soluble therein and, therefore, precipitates. It is filtered off, washed with methanol and dried. It is further purified by crystallising from hot n-butyl alcohol and is then pure. It dissolves in concentrated sulphuric acid with a dirty blue-green and in organic solvents with a blue colour.

Finely distributed in aqueous dispersion, it dyes cellulose triacetate or polymeric ethylene glycol terephthalate under the conditions usual for disperse dyestuffs in clear blue shades which have remarkable fastness.

If, in the above example, the mixture of 1,4,5,8-tetrahydroxy-anthraquinone and 1,4,5,8-tetrahydroxy-leuco-anthraquinone is replaced by 12.8 parts of 1,4,5-trihydroxy-anthraquinone and 12.9 parts of 1,4,5-trihydroxy leuco-anthraquinone, then a somewhat more reddish dyestuff is obtained. Dyeings attained therewith on polyester fibres have similarly good fastness properties.

Example 8

12 parts of 1,4-dihydroxyanthraquinone, 12.1 parts of 1,4-dihydroxy-leuco-anthraquinone, 144.6 parts of 4-amino-3,5-diethyl-diphenylether and 4.65 parts of ortho-boric acid are thoroughly mixed and, after the addition of 9.2 parts of 2-methyl-2,4-pentane diol, the whole is heated, first for 2 hours at 105–110° whilst simultaneously removing the condensation water in a weak stream of nitrogen, and then for 28 hours at 135–140°.

The melt is then poured into 600 parts of 60° warm water which contains 20 parts of hydrochloric acid. The dyestuff of the formula

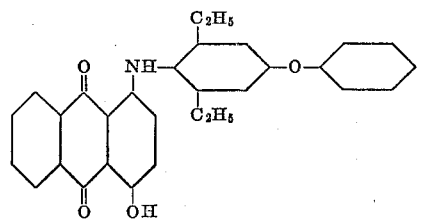

precipitates in the form of a fine dark powder. It is filtered off, washed, dried and recrystallized from sec. butyl alcohol. It is thus obtained in a pure, finely crystalline form. It dissolves in concentrated sulphuric acid with a blue and in organic solvents with a violet colour.

Polyester fabric is dyed from an aqueous dispersion thereof by the usual methods in clear violet shades which have good fastness properties.

If in the above example, the 4-amino-3,5-diethyl-diphenylether is replaced by 153 parts of 4-amino-3,5-diethyl-4′-methyl-diphenylether, 162.6 parts of 4-amino-3,5-diethyl-4′-methoxy-diphenylether or 165.3 parts of 4-amino-3,5-diethyl-4′-chloro-diphenylether, then analogous dyestuffs having similar shades and fastness properties are obtained.

Example 9

28.8 parts of the ester from 1 mol of ortho-boric acid and 1 mol of 2-methyl-2,4-pentane diol are added in an atmosphere of nitrogen to the melt of 24 parts of 1,4-dihydroxy-anthraquinone, 24.2 parts of 1,4-dihydroxyleuco-anthraquinone and 297 parts of 4-amino-3,5-dimethyl-4'-chloro-diphenylether and the melt is kept for 24 hours while stirring at a temperature of 130–135°. The water formed at the beginning of the reaction is distilled off through a sloping condenser.

The melt, when cooled, is pulverised and added to 1000 parts of dilute sulphuric acid at 60°. Excess 4-amino-3,5-dimethyl-4'-chloro-diphenylether is dissolved and the dyestuff of the formula

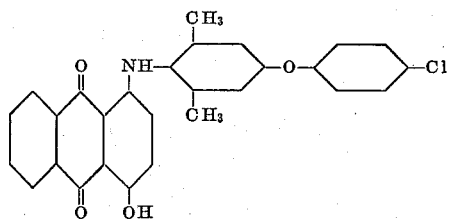

precipitates as a dark powder. It is filtered off, washed with water until the washing water is neutral, dried and, if desired, further purified by recrystallisation from hot n-butyl alcohol.

It dissolves in concentrated sulphuric acid with a blue and in organic solvents with a violet colour.

From an aqueous dispersion of the finely distributed dyestuff, possibly in the presence of carriers such as phenylphenol, at temperatures between 95 and 100°, polyester fabric is dyed a very fast violet shade.

If instead of the 4-amino-3,5-dimethyl-4'-chloro-diphenyl ether, 272.4 parts of 4-amino-3-methyl-5-ethyl-diphenyl ether or 338.4 parts of 4-amino-3,5-dimethyl-2',4'-dichloro-diphenyl ether are used, then dyestuffs are obtained which dye polyester fabric in similar shades which are fast to light and washing.

*Example 10*

2 parts of the dyestuff obtained according to Example 4, finely milled, are dispersed in 4000 parts of water.

12 parts of the sodium salt of o-phenylphenol and 12 parts of diammonium phosphate are added to this dispersion and 100 parts of a polyethylene glycol terephthalate fabric are dyed for 1½ hours at 95–98°. The dyeing is rinsed and washed with dilute caustic soda lye and an anion active dispersing agent.

In this way a clear violet dyeing is obtained which is fast to light, washing, sublimation and industrial fumes. Similarly good dyeings are also obtained by the same method with the other dyestuffs described in the examples.

*Example 11*

2 parts of the dyestuff obtained according to Example 1, finely milled, are suspended in 4000 parts of water which contains 2 parts of a synthetic dispersing agent. The pH of the dyebath is adjusted to 6.5 with acetic acid.

100 parts of polyethylene glycol terephthalate fabric are entered at 40°, the temperature is raised in the autoclave to 130° within 15 minutes and kept for 45 minutes at this temperature. The dyeing is rinsed with water and soaped. In this way, an intensive violet dyeing is obtained which is fast to light and washing and has particularly good fastness to industrial fumes.

Similarly good dyeings are obtained by the same dyeing method with the other dyestuffs described.

What is claimed is:

1. An anthraquinone dyestuff selected from the group consisting of dyestuffs of the formulae (A) 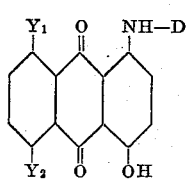

and (B) 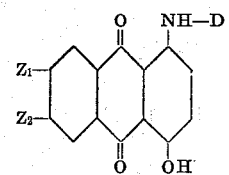

wherein
each of the $Y_1$ and $Y_2$ is a member selected from the group consisting of hydrogen and hydroxy,
one of $Z_1$ and $Z_2$ is a member selected from the group consisting of Cl, Br and F and the other is a member selected from the group consisting of H, Cl, Br and F,
D is a member selected from the group consisting of a radical of the formula

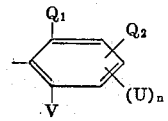

and a radical of the formula

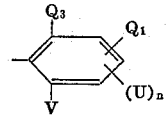

wherein
$Q_1$ is a member selected from the group consisting of phenyloxy, phenylthio, fluoro-phenyloxy, chloro-phenyloxy, bromo-phenyloxy, fluoro-phenylthio, chloro-phenylthio, bromo-phenylthio, lower alkyl-phenyloxy, lower alkyl-phenylthio, lower alkoxy-phenyloxy, and lower alkoxy-phenylthio,
$Q_2$ is a member selected from the group consisting of hydrogen, lower alkyl and lower alkoxy,
$Q_3$ is a member selected from the group consisting of lower alkyl and lower alkoxy,
U is lower alkyl,
$n$ is an integer from 0 to 2, inclusive and
V is a member selected from the group consisting of lower alkoxy and lower alkyl.

2. An anthraquinone dyestuff of the formula

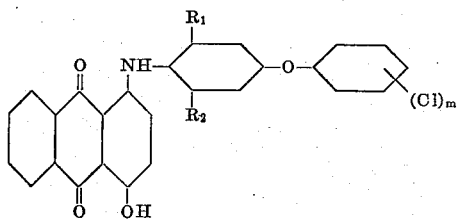

wherein
$R_1$ and $R_2$ are each independently a lower alkyl radical having 1 to 2 carbon atoms and
$m$ is one of the numerals 0 to 2 inclusive.

3. The anthraquinone dyestuff of the formula

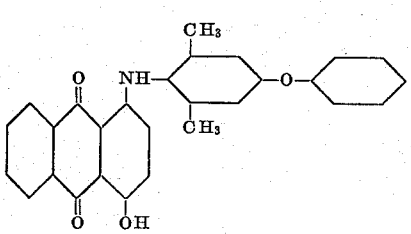

4. The anthraquinone dyestuff of the formula

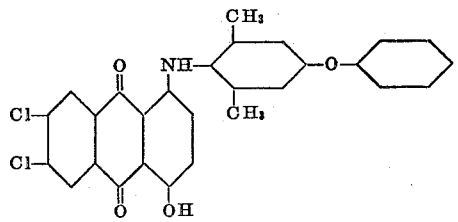

5. The anthraquinone dyestuff of the formula

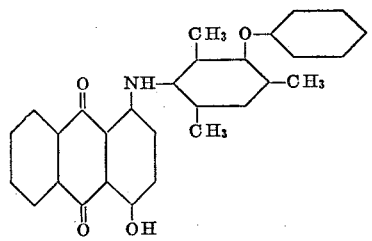

6. The anthraquinone dyestuff of the formula

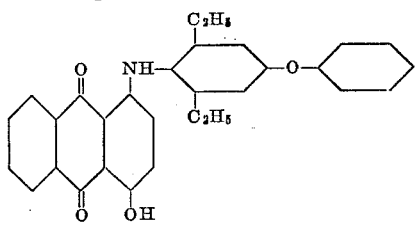

7. The anthraquinone dyestuff of the formula

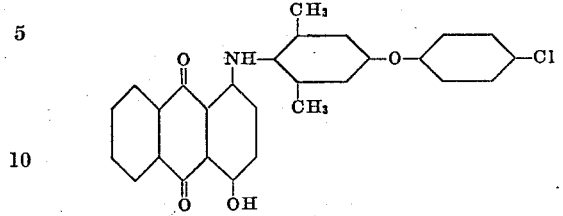

References Cited by the Examiner

UNITED STATES PATENTS

| | | | |
|---|---|---|---|
| 2,485,764 | 10/1949 | Ogilvie | 260—380 |
| 2,845,443 | 7/1958 | Hindermann et al. | 260—380 |
| 2,850,510 | 9/1958 | Hoefle et al. | 260—373 |
| 2,993,917 | 7/1961 | Weinstein et al. | 260—373 |
| 3,055,930 | 9/1962 | Graf et al. | 260—247.1 |

FOREIGN PATENTS

| | | |
|---|---|---|
| 835,819 | 5/1960 | Great Britain. |
| 200,926 | 1/1939 | Switzerland. |

LORRAINE A. WEINBERGER, *Primary Examiner.*
DUVAL McCLUTCHEN, NICHOLAS S. RIZZO,
*Examiners.*